US010902349B2

(12) United States Patent
Ghosh et al.

(10) Patent No.: US 10,902,349 B2
(45) Date of Patent: Jan. 26, 2021

(54) SYSTEMS AND METHODS FOR MACHINE LEARNING USING A TRUSTED MODEL

(71) Applicant: SRI International, Menlo Park, CA (US)

(72) Inventors: Shalini Ghosh, Redwood City, CA (US); Patrick D. Lincoln, Woodside, CA (US); Bhaskar S. Ramamurthy, Los Altos, CA (US)

(73) Assignee: SRI International, Menlo Park, CA (US)

( * ) Notice: Subject to any disclaimer, the term of this patent is extended or adjusted under 35 U.S.C. 154(b) by 829 days.

(21) Appl. No.: 15/629,082

(22) Filed: Jun. 21, 2017

(65) Prior Publication Data

US 2017/0364831 A1 Dec. 21, 2017

Related U.S. Application Data

(60) Provisional application No. 62/352,939, filed on Jun. 21, 2016.

(51) Int. Cl.
*G06N 20/00* (2019.01)
*G06F 11/30* (2006.01)
*G06N 7/00* (2006.01)
*G06F 40/40* (2020.01)

(52) U.S. Cl.
CPC ............. *G06N 20/00* (2019.01); *G06F 11/30* (2013.01); *G06F 40/40* (2020.01); *G06N 7/005* (2013.01)

(58) Field of Classification Search
USPC ........................................................ 706/12
See application file for complete search history.

(56) References Cited

U.S. PATENT DOCUMENTS

| 8,534,544 | B1 * | 9/2013 | Eker ...................... G06K 19/10 235/375 |
| 8,928,582 | B2 * | 1/2015 | Senanayake ............ G06F 3/016 345/156 |
| 9,015,099 | B2 * | 4/2015 | Nitz ........................ G06N 5/048 706/46 |
| 9,046,917 | B2 * | 6/2015 | Senanayake .............. G06F 3/01 |

(Continued)

OTHER PUBLICATIONS

International Search Report and Written Opinion dated Sep. 12, 2017 for Application No. PCT/US2017/38531, 14 pages.

*Primary Examiner* — Michael B Holmes
(74) *Attorney, Agent, or Firm* — Moser Taboada

(57) ABSTRACT

Methods and systems of using machine learning to create a trusted model that improves the operation of a computer system controller are provided herein. In some embodiments, a machine learning method includes training a model using input data, extracting the model, and determining whether the model satisfies the trust-related constraints. If the model does not satisfy the trust-related constraint, modifying at least one of: the model using one or more model repair algorithms, the input data using one or more data repair algorithms, or a reward function of the model using one or more reward repair algorithms, and re-training the model using at least one of the modified model, the modified input data, or the modified reward function. If the model satisfies the trust-related constraints, providing the model as a trusted model that enables a computer system controller to perform system actions within predetermined guarantees.

21 Claims, 9 Drawing Sheets

(56) References Cited

U.S. PATENT DOCUMENTS

| | | | |
|---|---|---|---|
| 9,501,745 B2* | 11/2016 | Nitz | G06N 5/046 |
| 9,563,274 B2* | 2/2017 | Senanayake | G06F 3/016 |
| 9,917,860 B2* | 3/2018 | Senanayake | G06F 3/04815 |
| 10,050,868 B2* | 8/2018 | Porras | H04L 41/14 |
| 10,163,058 B2* | 12/2018 | Nitz | G06N 5/04 |
| 10,204,627 B2* | 2/2019 | Nitz | G10L 15/30 |
| 10,205,637 B2* | 2/2019 | Porras | H04L 41/147 |
| 10,250,641 B2* | 4/2019 | Porras | H04L 63/20 |
| 10,291,653 B2* | 5/2019 | Senanayake | G06F 3/04883 |
| 2009/0149968 A1* | 6/2009 | Hosoi | G01N 35/00594 |
| | | | 700/21 |
| 2014/0088989 A1* | 3/2014 | Krishnapuram | G06F 19/00 |
| | | | 705/2 |
| 2014/0201226 A1 | 7/2014 | Zadeh et al. | |
| 2016/0096270 A1 | 4/2016 | Ibarz Gabardos | |
| 2016/0377043 A1* | 12/2016 | Wang | F02D 35/028 |
| | | | 701/111 |
| 2019/0283248 A1* | 9/2019 | Guerin | B25J 9/1671 |

* cited by examiner

| S | DESCRIPTION | LABELS |
|---|---|---|
| 0 | INITIAL STATE | KEEPSPEED, KEEPLANE |
| 1 A | MOVING TO LEFT LANE A | KEEPSPEED, CHANGINGLANE |
| 2 A | MOVING TO RIGHT LANE A | KEEPSPEED, CHANGINGLANE |
| 3 A | REMAIN IN SAME LANE WITH SAME SPEED | KEEPSPEED, KEEPLANE |
| 4 A | RAMAIN IN SAME LANE WITH REDUCED SPEED | REDUCEDSPEED, KEEPLANE |
| 5 | MOVED TO LEFT LANE | CHANGEDLANE |
| 6 | MOVED TO RIGHT LANE | CHANGEDLANE |

SYSTEMS AND METHODS FOR MACHINE LEARNING USING A TRUSTED MODEL

CROSS-REFERENCE TO RELATED APPLICATIONS

This application claims priority to and the benefit of U.S. Provisional Patent Application Ser. No. 62/352,939, filed Jun. 21, 2016, which is incorporated herein by this reference in its entirety.

BACKGROUND

In machine learning (ML), computers are programmed to perform mathematical algorithms that can identify potentially interesting features of data, such as meaningful patterns. Machine learning systems are very useful and are being deployed in many real world situations. However, typical machine learning systems are complex and can sometimes have unreasonable output in certain circumstances. For example, data-based image recognition algorithms sometimes erroneously recognize completely unrelated images. Such unreasonable or erroneous output is even more problematic when machine learning algorithms are used in life-critical or mission-critical applications (e.g., self-driving cars, cyber security, surgical robotics, and the like).

One approach to providing assurance for complex learning systems is to provide a bounding envelope or wrapper that checks for potential violations dynamically, and corrects for that behavior. Such approaches are generally costly at run-time, may induce delay or hysteresis where there wasn't before, and may result in larger-than-necessary safety margins, in the good cases. In bad cases there may be no useful bounds on complex controllers.

Thus there is a need for improved model training systems and methods to ensure that machine learning algorithms provide some high-level correctness guarantees for various applications, including but not limited to life-critical and mission-critical applications. The inventors have provided herein machine learning methods and systems for improving the reliability of a computer system operation using machine learning that provides certain guarantees of operation through a model that has been proven as trusted or reliable.

SUMMARY

Machine learning methods and systems for improving the reliability of a computer system operation through the use of machine learning that provides certain guarantees of operation through a trusted model are provided herein. In some embodiments, methods and systems for improving the operation of a computer system controller through the use of machine learning are provided herein. In some embodiments, a machine learning method includes determining at least one trust-related constraint related to at least one system action that could be performed by the computer system controller, training a model of a computer system controller using an initial set of input data, extracting the model, determining whether the model satisfies the at least one trust-related constraint, when it is determined that the model does not satisfy the at least one trust-related constraint, modifying at least one of: the model using one or more model repair algorithms, the input data using one or more data repair algorithms, or a reward function of the model using one or more reward repair algorithms, and re-training the model using at least one of the modified model, the modified input data, or the modified reward function, and when it is determined that the model satisfies the at least one trust-related constraint, providing the model as a trusted model that improves the operation of the computer system controller by enabling the computer system controller to perform the at least one system action within predetermined guarantees.

In some embodiments, determining whether the output data extracted from the model satisfies the at least one trust-related constraint includes determining a trust score of the model indicating of how well the model satisfies the at least one trust-related constraint, wherein the model is determined to satisfy the at least one trust-related constraint when the trust score is greater than a predefined trust threshold, and wherein the model is determined to not satisfy the at least one trust-related constraint when the trust score is less than a predefined trust threshold. In addition, in some embodiments, a trust score of the re-trained model is determined. If the trust score of the re-trained model is less than a predefined trust threshold, than at least one of: (A) sending a notification to the computer system controller that no further modification is possible and that the model is not trusted; or (B) repeating steps (c)-(e) until it is determined that the model satisfies the at least one trust-related constraint. If the trust score of the re-trained model is greater than a predefined trust threshold, determining that the model satisfies the at least one trust-related constraint.

In other embodiments, a machine learning system for creating a trusted model that improves operation of a computer system controller includes a user interface configured to receive at least one trust-related constraint, a model training module configured to train a model using input data and machine learning algorithms, a model checking module configured to determine whether the model satisfies the at least one trust-related constraint, and at least one repair module, wherein the at least one repair module includes: (a) a model repair module that modifies the model using one or more model repair algorithms, (b) a data repair module that modifies the input data using one or more data repair algorithms, and (c) a reward repair module that modifies a reward function of the model using one or more reward repair algorithms, wherein the machine learning system is configured to provide the trained model to the computer system controller as a trusted model that improves the operation of the computer system controller by enabling the computer system controller to perform the at least one system action within predetermined guarantees when it is determined that the model satisfies the at least one trust-related constraint.

In some embodiments, a machine learning method for using machine learning to create a trusted model that improves operation of an autonomous vehicle controller includes receiving a temporal driving constraint that must be satisfied before the autonomous vehicle controller can perform an action, training a probabilistic model of the autonomous vehicle controller using an initial set of input data, determining whether the probabilistic model satisfies the temporal driving constraint, when it is determined that the model satisfies the temporal driving constraint, providing the model for use by the autonomous vehicle controller, when it is determined that the model does not satisfy the temporal driving constraint: (1) modifying at least one of: the model using one or more model repair algorithms, the input data using one or more data repair algorithms, or a reward function of the model using one or more reward repair algorithms; and (2) re-training the model using at least one of the modified model, the modified input data, or the modified reward function; and (3) once it has been determined that the re-trained model satisfies the temporal driving constraint, providing the model to the autonomous vehicle controller as a trusted model that improves the operation of the autonomous vehicle controller by enabling the autonomous vehicle controller to perform the at least one system action within predetermined guarantees.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1A:
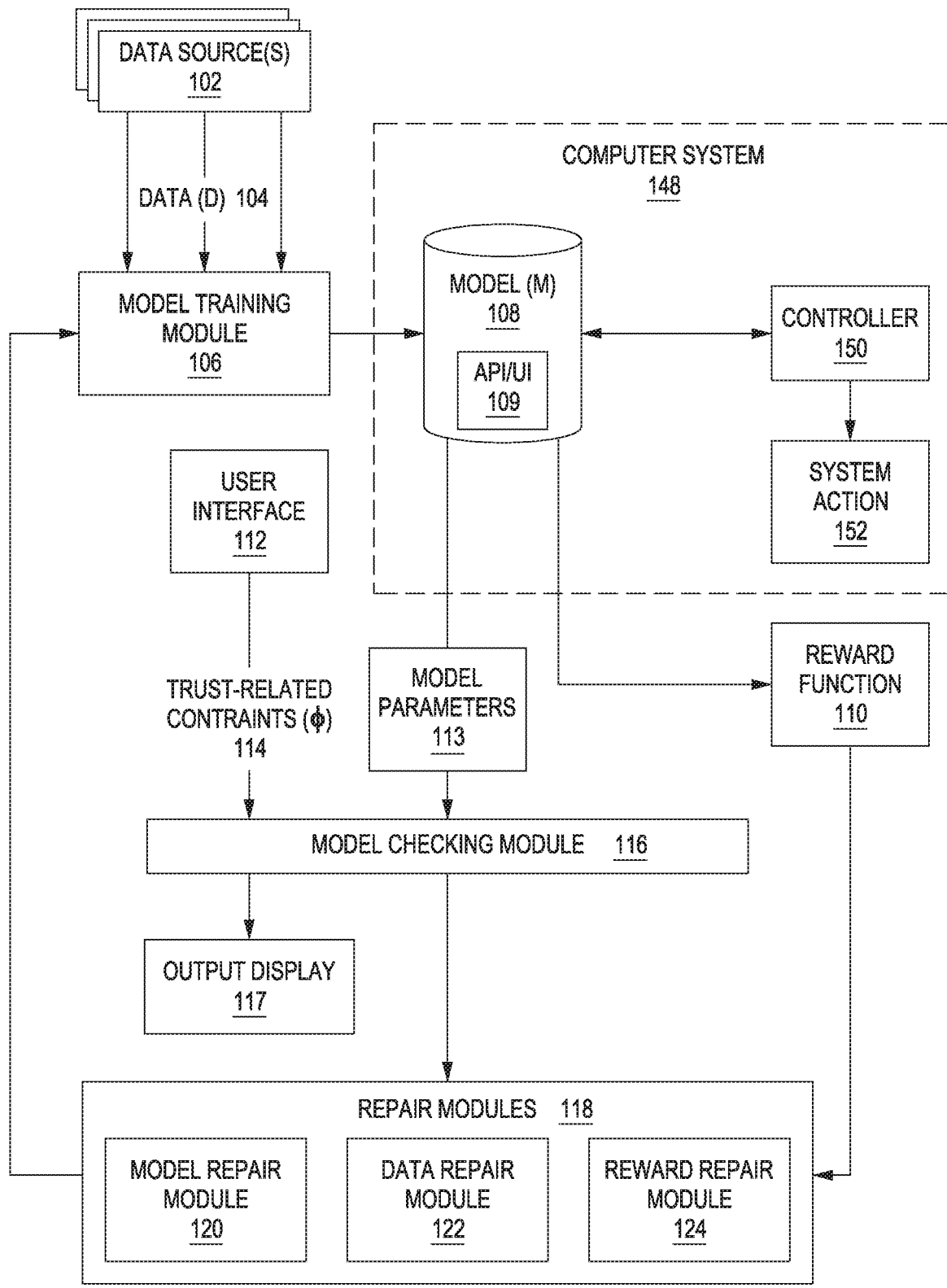
FIGS. 1A-1C are simplified module diagrams of an environment of a computing system including components for a machine learning system that uses a trusted model in accordance with some embodiments of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure improve the reliability of a computer system operation through the use of machine learning that provides certain guarantees of operation through a trusted model. This advantageously ensures that machine learning algorithms provide some high-level correctness guarantees for various applications, including but not limited to life-critical and mission-critical applications. The machine learning systems and methods disclosed herein advantageously produces a trusted model that can be provided to a computer system controller, such as an autonomous vehicle or robot controller for example, to improve that controller's operations. The outputs/parameters from the controller that determines the actions of the overall system (e.g., a car) are modified to fall within certain guarantees of the operational constraints of the system behavior. The trusted model provided to the controller by the machine learning system advantageously makes the controller more trustworthy, thereby making the system more reliable.

Embodiments consistent with the present invention provide machine learning systems and method which use symbolic analysis (specifically parametric model checking) to learn the dynamic model of a system where the learned model satisfies correctness requirements specified in the form of temporal logic properties (e.g., safety, security, liveness, or any other property that the model must meet). When a learned model does not satisfy the desired guarantees, one or more machine learning approaches are used improve the reliability of a computer system operation: (1) Model Repair, where a learned model is directly modified, (2) Data Repair, where the data is modified so that re-learning from the modified data will result in a trusted model, or (3) Reward Repair where the model uses a reward function which is not given as input, but is rather learned from data, and re-learning from the learned/corrected reward will result in a trusted model.

For example, a trust-related constraint such as a pre-defined property is initially provided to the model (i.e., a car does not run off the road or crash into other cars if those cars are moving at continuous heading and speed, or a robot arm should not come within five meters of any human operator during any phase of performing an autonomous operation). As used herein, a trust-related constraint can be any property/feature/parameter that must meet a certain guarantee level, reliability, or correctness. An initial model is used and the parameters of the model are learned using the available data. In some embodiments, the initial model may be incomplete and/or have errors, and the initial available data might have noise, errors, or malicious injections. The trust-related constraint is compared/checked against the parameters of the learned model. If the trust-related constraint fails to be satisfied within a predefined threshold (e.g., with a particular probability of satisfaction), the model, data and/or reward constraints are iteratively repaired/adjusted. In some embodiments, a trust score of the model is determined which provides an indication of how well the model satisfies the trust-related constraints. In some embodiments, the predefined threshold may be based on a threshold range that may be defined by the type of application and level of safety/trustworthiness required. For example, the threshold range, factors of safety and tolerances for cars may be different then for aircraft. The threshold range and factors of safety may be defined by specifications/regulations for the particular application. For example, for aviation, there are regulations regarding defining the maximum number of failures per hour for safety critical systems. In other embodiments, a cost benefit analysis is performed to determine the acceptable thresholds and threshold ranges.

Model adjustments may include splitting states, increasing the size of the finite-state control, adding or removing transitions in the control system, etc. Data adjustments may include removing outliers, filtering based on a model of the physical world is valid (i.e., to ensure machine learning of data is valid), and diagnosis of malicious injections. Reward adjustments/repair may include the modification of a reward function or using a corrected reward function that was learned from the data. By iterating model repair, data repair, and reward repair with machine learning steps, a resulting system/model is produced such that when it terminates, is guaranteed to satisfy the asserted property, or achieve a certain trust score, under certain assumptions. The machine learning methodology described herein ensures that the specified properties are satisfied and a trusted model is produced.

In one or more embodiments below, it is further described how the Model Repair, Data Repair and Reward Repair problems can be solved for the case of probabilistic models, specifically Discrete-Time Markov Chains (DTMC) or Markov Decision Processes (MDP), when the desired properties are expressed in Probabilistic Computation Tree Logic (PCTL). Specifically, it is described below how the parameter learning problem in the probabilistic Markov models under temporal logic constraints can be equivalently expressed as a non-linear optimization with non-linear rational constraints, by performing symbolic transformations using a parametric model checker and/or a non-linear optimizer.

While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Figure 1B:
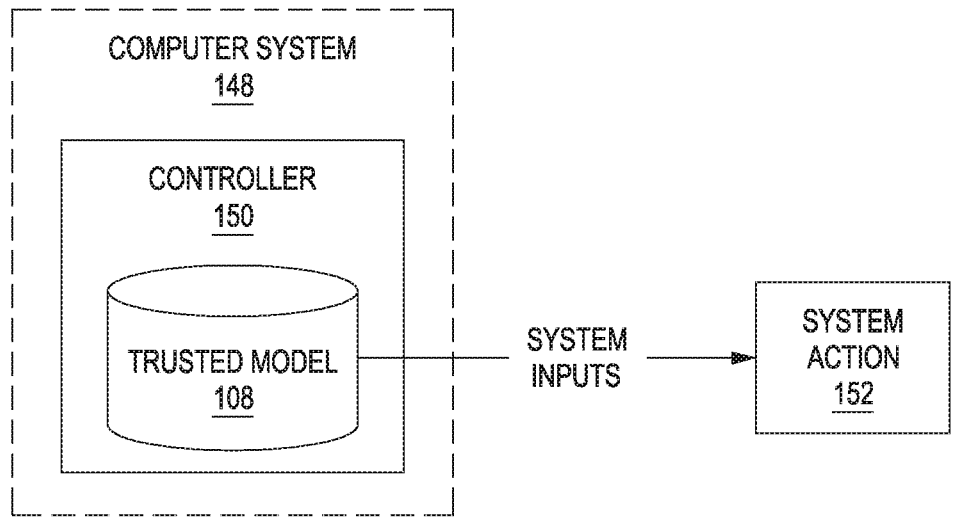
Figure 1C:
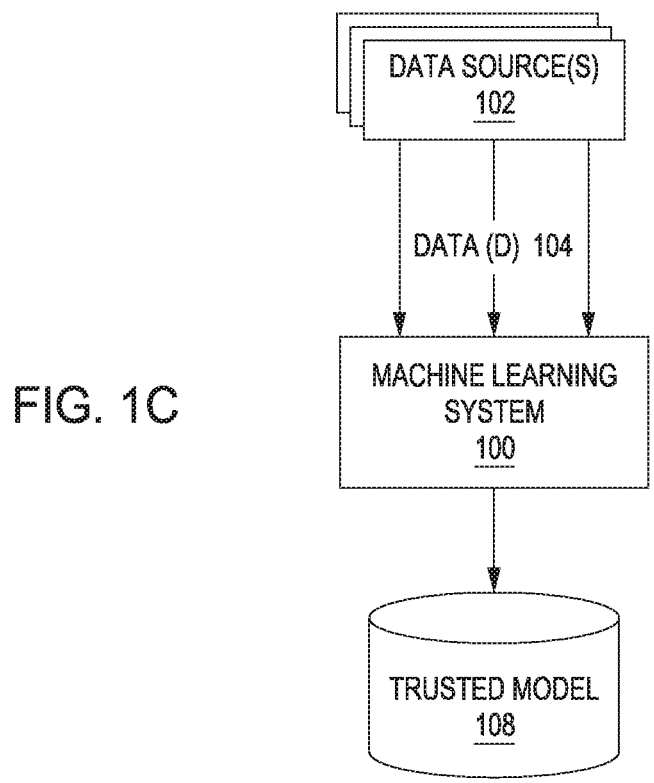

FIGS. 1A-1C depict embodiments of a machine learning system 100 that are configured to ensure that the learned models satisfy some high-level correctness requirements. The machine learning system exists to improve the operation of one or more controllers 150 of a computer system 148 so that the controllers 150 can initiate system actions 152 that will occur within acceptable parameters or guarantees. The machine learning system 100 can exist within the computer system 148, or independently interface with the computer system 148.

An initial set of data (D) 104 from one or more data sources 102 is provided to train a model (M) 108. The model 108 is trained by a model training module 106 that uses one or more ML algorithms. For example, in some embodiments, the data 104 is provided in the form of example traces of driving in this situation in a simulated environment, and learn a Markov Chain model M of the controller from D. In one embodiment, an aspect of the autonomous car controller can be the lane change controller (i.e., controller 150) must respect/meet certain trust-related constraints (φ) 114 which may be provided/set by an operator or user via a user interface 112. For example, the controller 150 must ensure that detecting a slow-moving truck in front causes the car to either change lanes or reduce speed with very high probability. In some embodiments, trust-related constraints 114 include default parameters that must be met by the model 108 to ensure a trusted model.

The user interfaces 112 can accept trust-related constraints 114 and include the ability to convert natural language specifications to logical formulas using a tool called ARSENAL, or the like. ARSENAL is adapted to building a natural language (NL) interface for users to interact with the system and specify/refine the properties of interest that come from the environment. This would help the analyst/operator to specify rich and complex constraints (e.g., PCTL) in natural language, without being overwhelmed by the burden of using complex logical formalisms.

As shown in FIG. 1, parameters 113 of the trained model 108 and the trust-related constraints 114 are input to a model checking module 116. In some embodiments, the model checking module 116 may perform parametric model checking using a probabilistic symbolic model checker such as PRISM or STORM. The model checking module 116 will analyze the model parameters 113 and the trust-related constraints 114 to determine of the model satisfies the trust-related constraints 114. In some embodiments, the model checking module 116 will calculate a trust score associated with the model using the model parameters 113 and one or more of the trust-related constraints 114. The trust score is a computation that provides an indication of how well the model 108 satisfies the trust-related constraints 114. In some embodiments, the trust score is based on a probability that the parameters 113 of the trained model will satisfy the at least one trust-related constraint within a predefined risk tolerance. In other embodiments, the trust score may be a value indicating how many constraints were satisfied with the model. If 100% of the constraints are satisfied, then the score may be 100. If 50% of the constraints are satisfied, the score may be 50.

In some embodiments, each trust-related constraint 114 may also have one or more trust parameters associated with it. The trust parameters inform the system if a particular constraint can be violated in normal operation and can remain violated until a certain condition is met. For example, in an autonomous driving system, there may exist a speed constraint that requires the vehicle to always drive at or below the speed limit. However, there may be situations where the speed constraint may need to be violated while legally passing a slow moving vehicle. Thus, in those situations, according to the trust parameter, the system controller may allow the vehicle to violate/exceed the speed constraint (e.g., drive at or exceed the speed limit) for a certain period. The model checking module 116 would take such trust parameters and acceptable violations into consideration when determining whether the model satisfies the trust-related constraints 114. In some embodiments, the trust score would be adjusted to account for such trust parameters and acceptable violations.

If the model satisfies the trust-related constraints 114, or the trust score is above a trust threshold, the model is provided to the computer system 148 and/or controller 150 as a trusted model. The trust threshold may be a predefined default value set by an operator, or received as input through a user interface (e.g., 112) from a user. The trust threshold may be dynamically adjusted in some embodiments.

If the model does not satisfy the trust-related constraints 114, or the trust score is below a predefined trust threshold, one or more of the model M 108, the data D 104, and learned reward functions 110 derived from the data D 104 are provided to the repair modules 118. More specifically, one or more repair modules 116 may be used to improve the reliability of a computer system operation: (1) a model repair module 120 is used, where a learned model is directly modified, (2) a data repair module 122 is used, where the data is modified so that re-learning from the modified data will result in a trusted model, and/or (3) a reward repair module 124 is used when we can learn a corrected reward for a reward-based model, which will result in a trusted model.

Once at least one of the model, data or reward is repaired by repair modules 118, the model is re-trained using by the model training module 106 to produce a revised trained model. This process iteratively continues until it is determined that the model satisfies the trust-related constraints 114. Once it is determined that the model 108 satisfies the trust-related constraints 114, the trusted model is provided to the controller 150 of computer system 148. The controller 150 makes decisions on what systems actions 152 of the overall system (e.g., a car) should be performed based on the trusted model 108. In some embodiments, the trusted model 108 may be accessed by the computer system 148 and/or controller 150 via calls to an application programming interface (API)/User interface 109.

In some embodiments, if the model does not satisfy the trust-related constraints 114, or the trust score is significantly below a predefined trust threshold such that there is no amount of modifications to the model, data or reward functions that would produce a trusted model, the system may send a notification to the computer system 148/controller 150 and/or output display 117 indicating that no further modification is possible and that the model is not trusted. In other words, if it is determined that the model cannot be retrained using one of the repair algorithms described herein in order to produce a trusted model, then the notification indicating that no further modification is possible and that the model is not trusted is sent. In that case, the user has the option to adjust or modify one or more of the trust-related constraints 114, to the extent possible, and retry training a trusted model with the new constraints.

In some embodiments, the model checking module 116 will display the output results of its analysis on output display 117. In some embodiments, the output display 117 may display the trust score as the model is being trained. The operator may choose to proceed until a certain level of score is achieved. At each result, the display could show the user which constraints were satisfied. Other information relating to model 108 (e.g., model parameters 113, etc.) may also be displayed on output display 117. This allows an end user/operator to review the results of the model checking module 116 and/or the model 108.

Each of the components 106, 116, 118, 120, 122, 124, 148, and 150 of the computing system 100 and their respective subcomponents may be embodied as hardware, software, a combination of hardware and software, or another type of physical component. Details of the methodology and algorithms used by the components described in FIG. 1 are discussed below.

In some embodiments, the model 108 is initially trained using machine learning algorithms such as a maximum likelihood inverse reinforcement learning methodology, supervised learning or unsupervised (or semi-supervised) learning.

Reinforcement learning is concerned with how a system/controller should perform actions in an environment so as to maximize a reward. In reinforcement learning, a reward function informs the model/system how well the current actions performed and states are doing. Reinforcement learning algorithms attempt to find a policy that maps states of the world to the actions the system should take in those states. The trained model 108 may consist of states and transitions between states, which may be labeled with labels chosen from a set; the same label may appear on more than one transition. In some embodiments, the maximum likelihood inverse reinforcement learning methodology includes using a maximum likelihood estimation to the problem of inverse reinforcement learning to identify unknown reward functions from traces of the initial input data.

In one embodiment, supervised learning approaches categorization tasks by utilizing a support vector machine (SVM) algorithm. SVM approaches use kernels that define a mapping from one data representation to another, enabling low-dimensionality learners to learn to categorize data elements. In some embodiments, the mapping may be parameterized mapping.

With respect to unsupervised or semi-supervised approaches to clustering, centroiding-based clustering of unlabeled or partially-labeled data may be used. The k-means clustering method forms approximations of centroids (think: center of mass) of a set of data points, and records their centers. Given new unlabeled data, the k-means approach is used to decide if a new data point falls within an existing cluster (and if so, which one) or is part of a new cluster, or possibly cause an existing cluster to be split (i.e., re-cluster existing data points).

Figure 3A:
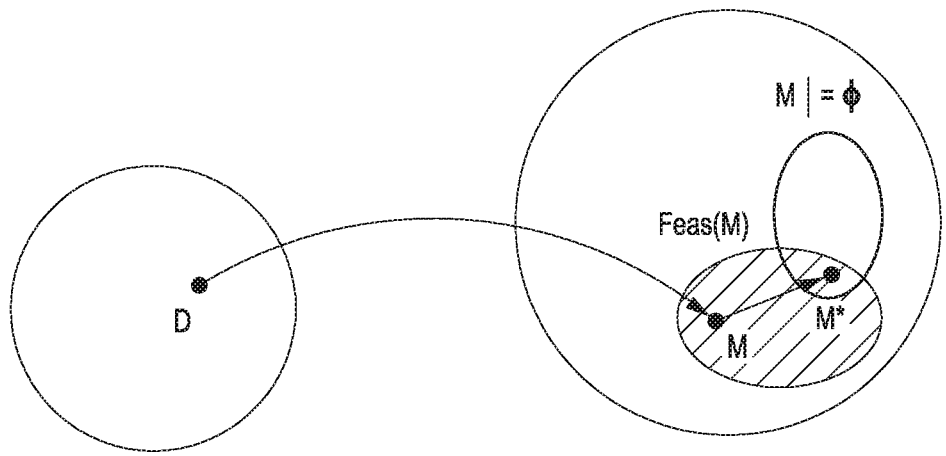
FIG. 3A depicts a modification to a model M in accordance with some embodiments of the present disclosure.

Let M 108 be a class of models (concept class) and D 104 be the universe of all data sets. Let ML be a machine learning procedure that takes $D \in D$ and returns $M \in M$. Let the trust-related constraint $\varphi$ 114 be a desired temporal logic property that the learned model 108 should possess. The fact that a model M 108 has the property $\varphi$ 114 is denoted by $M \models \varphi$. If a model $M = ML(D)$ (trained on some data set D) does not satisfy the property $\varphi$ 114, then either the model M 108 or the data set D 104 is repaired. In some embodiments, a reward function may also, or alternatively, be repaired which is discussed in further detail below. In some embodiments, only certain "repairs" are identified by some predefined constraints (i.e., arbitrary "repairs" are not considered). Given M 108, let $Feas_M \subseteq M$ denote all "feasible repairs" of M 108. Given D 104, let $Feas_D \subseteq D$ denote all "feasible repairs" of D 104. Let $c(M, M')$ denote the cost (a positive real function) of changing M to M', and $c(D, D')$ denote the cost of changing D to D'. Based on these notations, in some embodiments, the definitions of Model Repair and Data Repair are:

Model Repair: Given M, $\varphi$, $Feas_M$, and the function c, the Model Repair problem seeks to find $M^* \in M$ such that $M^* \in Feas_M$ and $M^* \models \phi$, and $M^*$ minimizes the cost $c(M, M^*)$. See FIG. 3A.

Figure 3B:
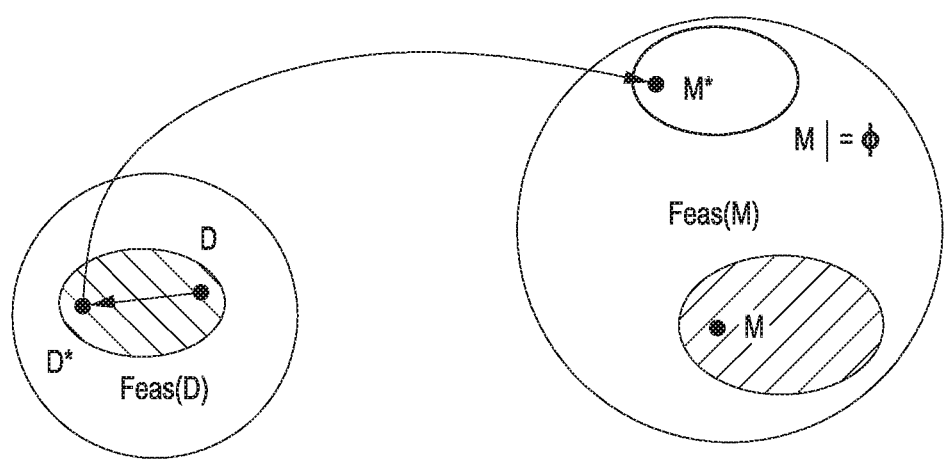
FIG. 3B depicts a modification to data D in accordance with some embodiments of the present disclosure.

Data Repair: Given D, $\phi$, $Feas_D$, and the function c, the Data Repair problem seeks to find $D^* \in D$ such that $D^* \in Feas_D$, $ML(D^*) \models \phi$, and $D^*$ minimizes the cost $c(D, D^*)$. See FIG. 3B.

Given a dataset D, a model $M = ML(D)$ is first learned using a machine learning procedure ML (e.g., maximum likelihood training). If $M \models \varphi$, model M is output. Otherwise, Model Repair is performed on M to get M', where Model Repair makes small perturbations to M. If $M' \models \varphi$, M' is output. Else, if the Model Repair formulation has no feasible solution, the "small perturbations" constraint is relaxed on Model Repair (and thereby consider a larger feasible set M ("large perturbations")), to see if that enables the modified model to satisfy the property. If it is preferable to modify the data, Data Repair of the data D is performed using small perturbations on the data to get D' and check if $M'' = ML(D') \models \varphi$. If it does, M'' is output. Otherwise, the constraint of "small perturbations" on the data is relaxed, the model is retrained, and the retrained model is check to see if it satisfies the constraint. If it doesn't, it is reported that $\varphi$ cannot be satisfied by the learned model using the above formulations of Model Repair or Data Repair.

In some embodiments, model repair may include model adjustments such as splitting states, increasing or decreasing the number of states, adding or removing transitions in the control system, etc. For a finite state machine model, within each state, the present state is determined as well as how and when to move to the next state. For example, in the context of an autonomous vehicle controller, the present/first state may be "make a left turn", while the next/second state "stop the vehicle". It may be determined that the present model should be adjusted to lower the threshold from transitioning from one state (e.g., "make a left turn") to another (e.g., "stop the vehicle"). In the alternative, it may be determined that a new state should be added between the first and second states for safety reasons. For example, if driving at high speed with no stop sign in view, a new second state may be added to reduce speed expecting there to be a stop sign before reaching the third state to stop the car at the stop sign, thus increasing the number of finite states and transitions. In addition, in some embodiments, model repair may include changes in the probabilities of the transitions from one state to another to satisfy certain guarantee on the properties. In some embodiments, states are neither added nor removed during model repair.

The discussion below addresses and solves two of the problems outlined above for specific choices of the concept class (M), the possible modifications ($Feas_M$, $Feas_D$), and the property language (used to specify φ). In particular, model M 108 is considered to be a probabilistic model(s) like Discrete-Time Markov Chains (DTMC) or Markov Decision Processes (MDP), and φ to be PCTL. Note that PCTL is a probabilistic temporal logic used widely for formally specifying temporal properties (i.e. trust-related constraints 114) including properties that should always be true and properties should eventually become true (e.g., liveness properties) and their combinations—such temporal logic properties are useful for specifying important requirements of models used in cyber-physical system (CPS) domains, e.g., self-driving cars, cyber security.

Figures 2A, 2B:
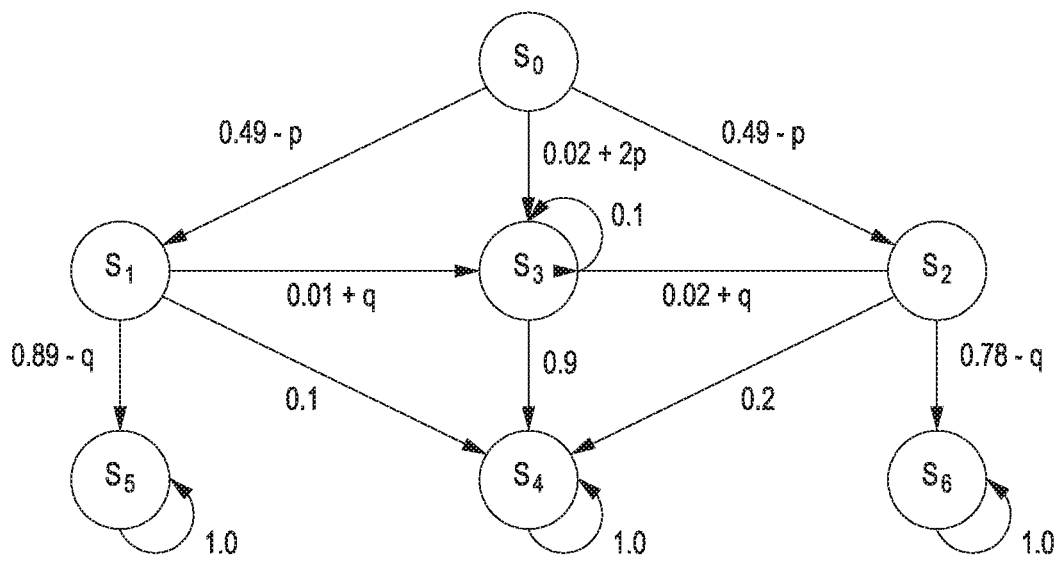
FIG. 2A depicts a Discrete-Time Markov Chain (DTMC) that determines the action of an autonomous car controller when confronted with a slow-moving truck in front in accordance with some embodiments of the present disclosure.
FIG. 2B depicts the semantics of the different states and labels of the DTMC in FIG. 2A in accordance with some embodiments of the present disclosure.

Specifically, in the context of training a probabilistic model for an autonomous car controller, the underlying model to be learned is a DTMC, which is defined as a tuple M=(S,s0,P, L) where S is a finite set of states, $s_0 \in$ S is the initial state, P: S×S→[0,1] is a transition matrix such that $\forall s \in S, \Sigma_{s' \in S} Pr(s, s')=1$, and L:S→$2^{AP}$ is a labeling function assigning labels to states, where AP is a set of atomic propositions. FIG. 2A shows a DTMC that determines the action of an autonomous car controller when confronted with a slow-moving truck in front, while FIG. 2B outlines the semantics of the different states and labels. It is later shown how Model Repair is performed by finding instantiations for the parameters p and q in the model.

Say there exists a property φ in PCTL that the model M needs to satisfy. In PCTL, properties are specified as φ=$Pr_{\sim b}$(ψ), where $\sim \in \{<, \leq, >, \geq\}$, 0≤b≤1, and ψ a path formula. A path formula is defined using the temporal operators X (next) and $U^{\leq h}$ (bounded/unbounded until), where h is an integer. PCTL also uses the eventually operator F (defined as Fφ=true Uφ), where Fφ means that φ is eventually true. A state s of M satisfies φ=$Pr_{\sim b}$(ψ), denoted as M,s⊨ φ, if Pr ($Path_M(s,\psi)$)~b; i.e., the probability of taking a path in M starting from s that satisfies ψ is ~b, where path is defined as a sequence of states in the model M. For example, let us consider a DTMC M in FIG. 1 with start state $S_0$. The "reducedSpeed" predicate is true in the state $S_4$, while "changedLane" predicate is true in states $S_5$ and $S_6$. Now, a probabilistic property/constraint can be specified as: =$Pr_{>0.99}$ [F(changedLane or reducedSpeed)]. M will satisfy the property φ only if any path starting from $S_0$ eventually reaches $S_4$, $S_5$ or $S_6$ with probability>0.99.

Note that the DTMC lane change controller considered here is part of an overall autonomous closed-loop car controller. The lane changing DTMC module is triggered when the car gets too close to a vehicle in front, and hence it is a feedback controller. These controllers can be learned from car traces in a vehicle simulator. The "eventually change lanes or slowdown" property here illustrates a "liveness" property. In some embodiments, the computer system/controller 150 would use bounded-time variants of such a liveness property.

In some embodiments consistent with the claimed invention, the model M is considered to be a probabilistic model—specifically, DTMC or MDP. Specifically, the model M 108 consists of all DTMCs (or MDPs) with a fixed (graph) structure, but different transition probabilities. The property φ 114 is a temporal logic property in PCTL. Efficient solvability of the two problems defined above depends also on the choice of the "allowed repairs", given by the subclass $Feas_M$ or $Feas_D$.

For Model Repair, the subclass $Feas_M$ consists of all models M'∈M such that M' and M both have nonzero transition probabilities on the same set of edges. The user can additionally constrain (e.g., using lower and upper bounds on) the difference in the transition probabilities on corresponding edges, and thus, only consider "small" perturbations. Note that re-parameterizing the entire transition matrix can be considered as a possibility in Model Repair. How much of the transition matrix is considered repairable depends on the application at hand—the domain helps determine which transition probabilities are perturbable and which are not (e.g., which part of the car controller can be modified).

For Data Repair, the subclass $Feas_D$ consists of all data sets D'∈D that can be obtained from D by user-specified operations. For example, in some embodiments, the data points to be dropped from the original dataset are considered; that is, the number of data points dropped from the total dataset defines the neighborhood of corrections. When a Model Repair, Data Repair or Reward Repair is run, a small correction (to the model or data, respectively) is first considered—if that does not succeed, the restriction is relaxed and larger corrections are considered/attempted.

An approach for solving Model Repair for probabilistic models if first discussed. The DTMC described above is referenced here in the example. Given a DTMC M with n states and n×n transition matrix P, a parametric DTMC $M_Z$ is created by introducing an n×n matrix Z (of unknowns), such that P+Z is a stochastic matrix and is the transition matrix of M. The unknown parameters in Z may be constrained: if $\exists j Z_{ij} > 0$, then the state i called a controllable state and the transition between states i and j of M is controllable, since its probability can be modified. The matrix Z gives a mechanism for altering or controlling the behavior of M for repair. The parametric DTMC $M_Z$ along with the constraints on Z defines the set $Feas_M$, as follows:

If M is a DTMC with transition matrix P and $M_Z$ is a DTMC with transition matrix P+Z, and $\forall s \Sigma_{t \in S} Z$ (s, t)=0, then M and M' are ε-bisimilar, where ε is bounded by the maximum value in Z.

Note that M'∈ $Feas_M$ and M are ε-bisimilar when there exists an ε-bisimulation between them, i.e., any path probability in M' is within ε of the corresponding path probability in M. FIG. 1 shows an example of a parametric DTMC.

Further, consider the non-zero values in Z to be the vector of variables $v=v_1 \ldots v_k$. The Model Repair problem is solved by solving the following optimization problem:

$$\operatorname*{argmin}_{v} g(v) \qquad (1)$$

$$\text{s.t., } M_Z \vDash \phi, \qquad (2)$$

$$P(i, j) + Z(i, j) = 0 \text{ iff } P(i, j) = 0, 1 \leq i, j \leq n. \qquad (3)$$

In Equation 1, g(v) is a cost function that encodes the cost of making the perturbation to model parameters—a typical function is the sum of squares of the perturbation variables, i.e., $g(v)=\|v\|^2=v_1^2+\ldots+v_n^2$. The main bottleneck in the Model Repair formulation in Equations 1-3 is the constraint in Equation 2—it is a temporal logical constraint, which is difficult to directly handle in a non-linear optimization problem. Next, it is shown how one can transform the above optimization problem with a "non-standard" temporal logical constraint to a standard non-linear optimization problem with non-linear constraints.

Consider a probabilistic model M and a probabilistic temporal logic formula φ. If M is a parametric Discrete-Time Markov Chain (DTMC) or parametric Markov Decision Process (MDP) and φ is expressed in Probabilistic Computational Tree Logic (PCTL), then the ModelRepair problem, specified in Definition 1 and Equations 1-3, can be reduced to an equivalent set of nonlinear optimization problems with non-linear rational constraints.

Given a parametric DTMC, properties that are specified in PCTL, either using intrinsic relations like X (next) and U (until) or operators like F (eventually) or G (always) 1, can be mapped to the parametric reachability problem in the parametric DTMC. So, any property specified in PCTL logic can be equivalently expressed as a reachability problem to a set of target states. The probability of reaching a set of target states in a parametric DTMC can be computed in the form of a rational function in the parameters using a parametric model checker. The main technique used by the parametric model checker is as follows: in order to succinctly express the probability of whether a target state is reachable along a path in terms of a closed-form rational function, it successively considers state sequences in the path of the form $s_1 \to s \to s_2$ and eliminates s from the path after suitably accounting for the probability of self-transition of s in a direct path from $s_1$ to $s_2$. In the path $s_1 \to s \to s_2$, let the probabilities of $s_1 \to s, s \to s, s \to s_2$ be $\Pr(s_1, s), \Pr(s, s), \Pr(s, s_2)$ respectively. s is then eliminated and the path is replaced by a direct connection between $s_1$ and $s_2$. Let $\Pr'(s_1,s_2)$ be the probability of transitioning from $s_1$ to $s_2$ along any other path. If s is removed and considered a direct edge from $s_1$ to $s_2$, the transition probability of this new edge can be equivalently expressed as $\Pr'(s_1, s_2)+\Pr(s_1, s). \Pr(s, s_2)/(1-\Pr(s, s))$, which is a rational function in the parameters of the model. Using successive state elimination, the parametric model checker is able to get an overall non-linear rational function constraint corresponding to the reachability property in Equation 2—as a result, ModelRepair in Equations 1-3 can be expressed as the non-linear optimization problem in Equations 4-6.

In the case of a parametric Markov Decision Process (MDP), $M=(S, s_0, Act, P_p, V)$, where $s, s_0$ are same as a DTMC, V is the vector of correction parameters as outlined in Section 4, and Act is a finite set of actions of the Markov Decision Process—in a parametric MDP the transition function P is repaired using the parameters V. Given a parametric MDP model, the MDP model can be reduced to an equivalent parametric DTMC where each state is created by considering a corresponding (state, action) pair in the MDP. There exists a decomposition of the parameter space of the parametric MDP into hyper-rectangles such that the problem of probabilistic reachability in the equivalent parametric DTMC for each hyper-rectangle corresponds to a rational function in the relevant parameters. So for a MDP, a disjunction of rational functions equivalent to a probabilistic reachability property specified in PCTL is finally obtained. For the disjunct of each rational function constraint (corresponding to each parameter hyper-rectangle), one can separately solve the corresponding ModelRepair non-linear optimization problem—a suitable combination of the solutions of the different non-linear optimization problems (e.g., min for arg min problems) will give the final result. So for an MDP, the ModelRepair problem can be equivalently expressed as a set of disjoint non-linear optimizations problems.

[1] Where G is defined as follows: $G\varphi = \neg(F \neg \varphi)$.

As outlined, if M is a DTMC or MDP, parametric model checking can convert Equations 1-3 to the following constrained optimization problem:

$$\min g(v), \qquad (4)$$

$$s.t. f(v) \sim b, \qquad (5)$$

$$\forall v_k \in v: 0 < v_k + P(i,j) < 1. \qquad (6)$$

where P(i, j) in Equation 6 corresponds to Z(i, j) matrix entries that have non-zero value $v_k$. In some embodiments, the reparameterization of Equation 2, encoding the satisfiability of φ in M, to the non-linear equation f(v) in Equation 5 can be obtained using a parametric model checker, e.g., PRISM, which is a probabilistic model checker, a formal verification software tool for the modelling and analysis of systems that exhibit probabilistic behavior. Solving the nonlinear objective function in Equation 4 with the non-linear constraints in Equation 5-6 would give a "local optimum" of Z that transforms M to M*. In some embodiments, that can be done using a non-linear optimization tool, e.g., AMPL which is an algebraic modeling language to describe and solve high-complexity problems for large-scale mathematical computing (i.e., large-scale optimization and scheduling-type problems). If the nonlinear optimization problem has a feasible solution, it gives us the optimal values of Z that makes the resulting model M*satisfy φ.

In some embodiments, the dataset D is modified to D' so that the model trained on D' satisfies φ. For this, the Data Repair problem described above needs to be solved and is a variant of machine teaching.

Based on the machine teaching formulation, the Data Repair problem can be formalized as:

$$\operatorname*{arg\,min}_{D', \Theta^*} E^T(D, D') \qquad (7)$$

$$\text{s.t. } M_{\Theta^*} \vDash \phi \qquad (8)$$

$$\Theta^* \in \operatorname*{argmin}_{\Theta} [R_L(D', \Theta) + \lambda \Omega(\Theta)], \qquad (9)$$

$$\text{s.t., } g(\Theta) \leq 0, h(\Theta) = 0. \qquad (10)$$

Here, the inner optimization models the standard machine learning objective of regularized empirical risk minimization, consisting of the empirical risk function $R_L$ and the regularizer $\Omega$. $E_T$ is the teaching "effort" function of modifying the dataset D to D', $M_{\Theta^*}$ indicates a model that is parameterized by $\Theta^*$, while g and h are other domain constraints.

Consider that the dataset D is transformed to D' using a data perturbation vector p. Then, consider that a subset of data points need to be dropped from D for the resulting trained model to satisfy $\phi$ (e.g., those points could have noisy features or labels). Therefore, each data point $d_i$ in D is multiplied by $p_i$, where $p_i=0$ indicates that the point is dropped—in this case, $p=\{p_1 \ldots p_n\}$, where $n=|D|$. Also, consider that the effort function is characterized by the magnitude of the data perturbation, i.e., $E_T(D,D')=|D|-\|p\|^2$. Using these transforms, Equations 7-10 can be reformulated as:

$$\underset{p,\Theta^*}{\operatorname{argmin}} |D| - \|p\|^2 \tag{11}$$

$$\text{s.t. } M_{\Theta^*} \vDash \phi, \tag{12}$$

$$\Theta^* \in \underset{\Theta}{\operatorname{argmin}} [R'_L(D, p, \Theta) + \lambda \Omega(\Theta)], \tag{13}$$

$$\text{s.t., } g(\Theta) \leq 0, h(\Theta) = 0. \tag{14}$$

Note that $R_L'(D, p, \Theta)$ is a reparameterization of $R_L(D', \Theta)$, where the use of the fact that D' is obtained by perturbing D using p. This formulation of Data Repair can handle the case where certain $p_i$ values are desired to be 1, i.e., the case where certain data points are kept because they are reliable.

Furthermore, consider a probabilistic model M and a probabilistic temporal logic parameter $\phi$. If M is a parametric Markov Chain (MC) or parametric Markov Decision Process (MDP) and $\phi$ is expressed in Probabilistic Computational Tree Logic (PCTL), then the DataRepair problem defined above, characterized by Equations 11-14, can be reduced to a set of non-linear optimization problems with non-linear rational constraints.

For Markov Chains, consider a parametric DTMC M. Also consider the data dropping model of DataRepair, where each data point $d_i$ is multiplied by the corresponding parameter $p_i$. The maximum likelihood estimate of the transition probability between any pair of states $s_1$ to $s_2$ in M would be the ratio of the counts of data points having that model transition, normalized by the total count of data points transitioning out of $s_1$. So, each transition probability in the DTMC model can be expressed as the ratio of polynomials in p, i.e., a rational function in p. As a result, Equations 11-14 can be equivalently expressed as Equations 15-16, which can be then transformed to a non-linear optimization problem with non-linear constraints.

For parametric Markov Decision Process (MDP) models, if the states, actions and transitions structure are given, the transition probabilities are determined. Note that one can either assume that the reward function is provided for all state-action pairs, or it can be learned using inverse reinforcement learning since it does not depend on the transition probabilities. For MDP models, it can be shown that the maximum likelihood transition probabilities are rational functions of the data repair parameters, so that Equations 11-14 reduces to a set of non-linear optimization problems of the form Equations 15-16.

As outlined above, to solve the non-linear optimization formulation in Equations 11-14, the inner optimization in Equations 13-14 is first solved using maximum likelihood—this gives us a DTMC model M(p), where the transition probabilities are rational functions of the data perturbation vector p. The outer optimization in Equations 11-12 can then be reformulated as:

$$\arg \min_p \|p\|^2 \tag{15}$$

$$s.t. M_p \vDash = \varphi \tag{16}$$

This can be solved by using symbolic analysis, specifically parametric model checking, in combination with non-linear optimization. In this case, data points that are being removed are considered. Similar formulations for Data Repair can be derived when data points being added or replaced are considered, or data features or labels being modified.

For Reward Repair, the problem of learning reward function in MDPs is considered to be the Inverse Optimal Control (IOC) or Inverse Reinforcement Learning (IRL) problem. For MDPs, the reward function is projected to a subspace where the at least one trust-related constraint is satisfied a subspace is defined by the boundary formed from the trust-related constraints. A successful outcome is one where the reward function is within the subspace close to the optimal point.

The probabilistic model discussed below is defined by the following equations:

$$P(U \mid \theta, T) = \frac{1}{Z(\theta)} \exp(\text{reward}(f_U)) \cdot P_T(U) = \frac{1}{Z(\theta)} \exp(\theta^T f_U) \cdot P_T(U) \tag{17}$$

$$\Rightarrow P(U \mid \theta, T) = \frac{1}{Z(\theta)} \exp\left(\sum_i (\theta^T f_{x_i})\right) \cdot \prod_i P_T(x_{i+1} \mid x_i, a_i) \tag{18}$$

where x are the states, a are the actions, $U=\{(x1, a1) \ldots (xn, an)\}$ is a trajectory of state action pair sequences, i is the index along the path/trajectory, T is the transition distribution of the MDP, and PT(U) is the probability of observing the transitions in the trajectory U in the MDP. Additionally, f is a feature vector defined over each state, $\theta$ is a weight vector, and the reward in a state is assumed to be a linear function of the features of that state, i.e.:

$$\text{reward}(f_U) = \theta^T f_U, \text{ where } \|\theta\|^2 \leq 1.$$

Note that a similar model is considered for continuous states and actions, but here discrete states and actions are considered in the above formulation. In some embodiments, bounded L1 norm of $\theta$ is also considered. In this formulation, the probability of a trajectory is proportional to the exponential of the total reward along the trajectory in the MDP multiplied with the probability of the transitions of that trajectory in the MDP. In order to learn the reward function, one has to learn $\theta$ (assuming f is known). Given a trace U, the log likelihood L=formulation given above is maximized, i.e.:

$$\theta^* = \arg\max_\theta \log P(U|\theta) \tag{19}$$

Note that Equation 19 can be solved for a given set of traces in the data, either by doing gradient descent. $\theta^*$ gives the optimal reward $R^*$. In the Reward Repair formulation, it is additionally enforced that a given set of rules are satisfied along with likelihood maximization. That is, it is enforced that:

$$E_Q[C_{l,g_1}(U)]=1 \tag{20}$$

where g is the grounding of lth rule $C_l(U)$. Note that the rules/constraints C are defined over the trajectory, and can be propositional or first-order. Q is the projection of P using updated reward function R' that satisfies the rule Cl (where R' has the same state features f but a different weight vector θ'). The projection approach is used to project the MDP probability P to the subspace that enforces the satisfaction of the given rules to get Q. This will involve solving the following equation:

$$\underset{Q,\zeta}{\operatorname{argmin}} KL(Q \| P) + k\|\zeta\|_1 \quad (21)$$

$$\text{s.t. } \lambda_l [1 - E_Q[C_{l,g_l}(U)]] \leq \zeta_l, \zeta_l \geq 0, l = 1 \ldots L$$

where the constraint enforces satisfaction of the rules, KL divergence minimizes the amount of difference between Q (defined over corrected reward R') and P (defined over optimal reward R*) caused by correcting the optimal reward function R* to R', and $\lambda_l$ is the importance weight associated with satisfying the rule (can be large in particular applications). Solving (5) using the Posterior Regularizer formulation gives us the path probabilities Q using the corrected reward function R' to be:

$$Q(U) \propto P(U) e^{-\Sigma_l g_l \lambda_l [1 - C_{l,g_l}(U)]} \quad (22)$$

Q gives us the path probability under the repaired reward. Note that this repair is intuitive. If for a set of groundings the rules are satisfied, then the argument of the exponent is 0⇒the corresponding Q for the path U is same as P. If the groundings do not satisfy a formula, then for large values of $\lambda_l$ the argument of the exponent is −∞⇒probability of that path is 0. Once the Q function is determined, it can be used to estimate R' by plugging in (1) into (6) and finding out the value of Q for every state transition from x1 to x2—this will give the value of R' corresponding to every triple <x1, x2, a>.

For propositional rules C, the groundings are provided by the values of the states and actions in the traces. For first order logic (FOL) rules C, w groundings based on all possible trajectories U drawn from the MDP are considered—this can be approximated by samples of trajectories drawn from the MDP. In order to generate the trajectory samples on which the FOL rules are evaluated, Gibbs sampling can be initially used.

Use cases of computer systems that utilize embodiments of the present invention are further described below in detail. For example, in the running example of the car-controller described above, it is assumed that the initial values of the DTMC model in FIG. 1 are learned using maximum likelihood estimation from simulated car traces. Four different use Model Repair cases are described below.

The first case is when the model 108 satisfies trust-related constraint 114. For example, consider the property $$\text{Prop1} = \underset{>0.99}{\text{Pr}}$$

[F(changedLane or reduceSpeed)], as described above. Also consider a model M in PRISM corresponding to FIG. 1, where two controllable correction variables, p and q, are considered. Initially p=q=0; therefore, no repair is performed (i.e., model, data or reward) since M satisfies Prop1 without the need for any repair.

The second use case is when Model Repair gives a feasible solution. For example, consider the property Prop2=Pr$_{>0.8}$[F(reduceSpeed)]. When a parametric model checker such as PRISM or STORM, for example, is run on M with p=q=0 for Prop2, PRISM reports that the property is not satisfied from the initial state $S_0$. The parametric model checking is run on M, which converts Prop2 to a non-linear parametric equation: 0.8<0.0001(−20000qp+16700p+9800q+1817). Using this as a constraint in AMPL, the objective, $p^2+q^2$, is minimized and the Model Repair solution p=0.3609, q=0.0601 is obtained.

In the third use case, Model Repair initially gives infeasible solution. For example, consider the property Prop3=Pr$_{<0.1}$[F(reduceSpeed)]. Parametric model checking and non-linear optimization states this to be a "infeasible problem", which indicates that Model Repair cannot perturb M in order to satisfy Prop3. So, Model Repair fails to find a solution in the ε-neighborhood of the original model M to satisfy Prop3, considering the correction parameters p and q. Subsequently, the correction parameters are relaxed beyond p and q.

In the fourth use case, Model Repair gives a feasible solution with more parameters. In this case, the number of correction parameters in the model is increased in FIG. 1, such that each edge in the DTMC has an associated perturbation variable. As expected, with the extra degrees of freedom Model Repair is able to make M satisfy Prop3.

Figure 2C:
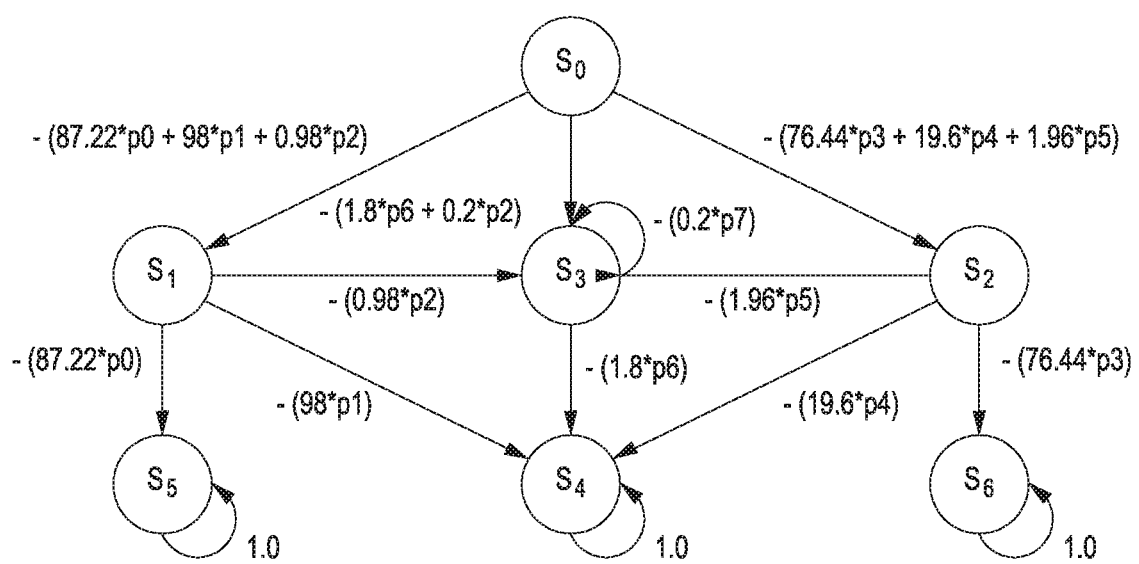
FIG. 2C shows the transition weights of the DTMC, estimated from the training data using maximum likelihood in accordance with some embodiments of the present disclosure.

Next, Data Repair in a car controller is described. First, it is noted that the structure of the Markov Chain is given as described above, and the training data is used to learn the transition probabilities. The data used to train the model is available in the form of traces of states. A sample dataset with 8 points for the case study, where each data point is a tuple of the form ($p_i$, $d_i$, $w_i$)—a data trace $d_i$ has an associated data dropping probability $p_i$ of dropping the trace from the training set, and a weight $w_i$ that indicates the weight given to that data trace during training the model: {(p0, (0,1,5), 87.22), (p1, (0,1,4), 98), (p2, (0,1,3), 0.98), (p3, (0,2,6), 76.44), (p4, (0,2,4), 19.6), (p5, (0,2,3), 1.96), (p6, (0,3,4), 1.8), (p7, (0,3,3), 0.2)}. FIG. 2C shows the transition weights of the DTMC, estimated from the training data using maximum likelihood—in the model, the transition weights are normalized so that the output probabilities out of each state sum to 1.0.

In the following use case of a car controller using Data Repair, assume the property Prop3=Pr$_{<0.1}$[F(reduceSpeed)]. The parametric model checking is run with PRISM on this model M to get the following non-linear equation corresponding to the property: (4900p1+49p2+980p4+98p5+90p6+10p7)/(4361p0+4900p1+49p2+3822p3+980p4+98p5+90p6+10p7). On running the AMPL non-linear solver, the following solution set for Data Repair is calculated: p0=1, p1=0.18, p2=0.00001, p3=1, p4=0.00001, p5=0.00001, p6=0.00001, p7=1. p0, p3 and p7 are kept unchanged by Data Repair, implying that the probabilities of data traces corresponding to right lane change, left lane change and staying in the same lane without reducing speed are kept the same, while the probabilities of the other data traces are reduced. The probability of reducing the speed is brought down, thereby satisfying the property.

In the final use case of the car controller, Data Repair becomes infeasible with less parameters. Specifically, it is noted that that if the number of allowable data perturbations is restricted such that <20% of the data points can be dropped, then Data Repair fails to give a feasible solution. So, ≥20% of the data is needed to change in order to satisfy the property using Data Repair.

Additional examples of computer systems that utilize embodiments of the present invention are further described below in detail. For example, Model Repair and Data Repair case studies on a Markov Decision Process (MDP) model for query routing in wireless sensor networks (WSN) are described below.

Figure 4:
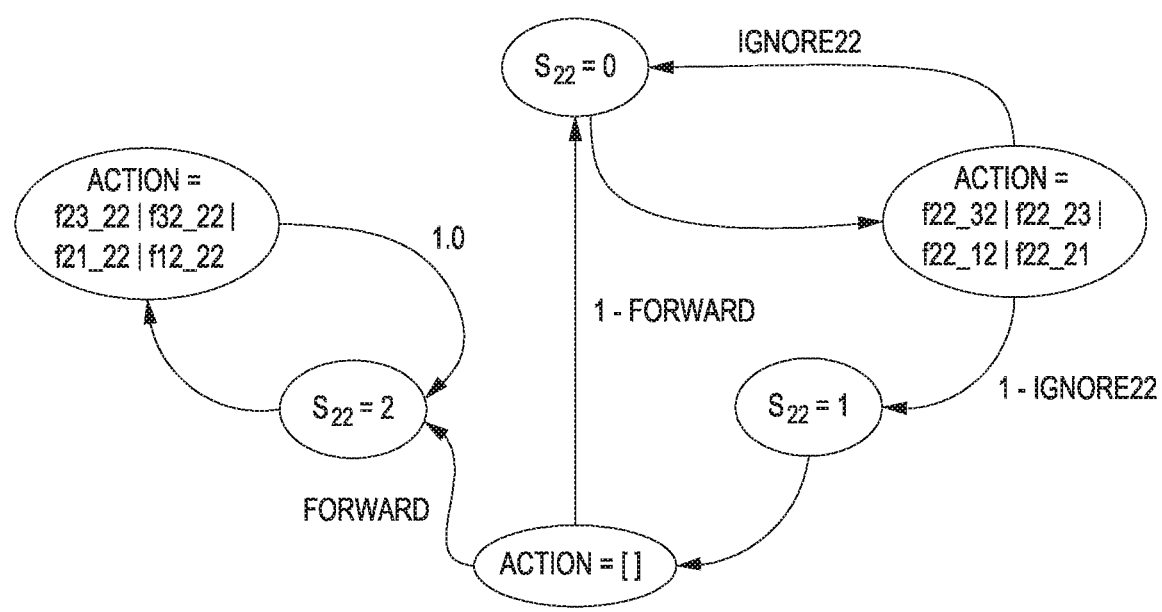
FIG. 4 shows the sub-component of a model centered around the states and action-related transitions corresponding to one node in a wireless sensor network in accordance with some embodiments of the present disclosure.

The first use case including WSNs includes query routing in WSNs. Consider a WSN arranged in a n×n grid topology (in our case-study n=3). The n=3 row corresponds to "field" nodes that are closer to the field of deployment, while n=1 corresponds to "station" nodes that are closer to the base station. An exemplary goal in this use case is to route any message originating from a node to $n_{11}$ via peer-to-peer routing in the minimum number of attempts, so that $n_{11}$ can forward the message directly to the base station hub. The network is modeled as a Markov Decision Process (MDP). FIG. 4 shows the sub-component of the overall MDP centered around the states and action-related transitions corresponding to one node in the network (node $n_{22}$ in the figure). Different node MDPs are connected through shared actions, e.g., the MDPs of nodes $n_{21}$ and $n_{22}$ are connected through the shared action $f_{11\_22}$ of forwarding a message from node $n_{22}$ to node $n_{11}$. A node has a fixed probability f of forwarding a message to a neighboring node in the network, and a node-dependent probability of ignoring the message. A node can be in one of 3 states—(a) S=0: on being forwarded a message, the node has decided to ignore the message; (b) S=1: node has not ignored the message and is considering whether or not to forward it; (c) S=2: node has forwarded the message. On the action of message forwarding from a neighbor, a node processes and forwards it to its neighbors probabilistically.

In another embodiment, the WSNs includes Model Repair in Wireless Sensor Networks. The reward function of the WSN MDP is used to estimate the number of forwarding attempts to route a message from one end of the network to another. The reward corresponding to every forward attempt is assumed to be 1.0—the total reward counts the number of forwarding attempts necessary to route the message across the network. The structure of the MDP is decided by the grid structure of the network, and each node has a state/action transition diagram similar to FIG. 4. The transition probabilities in the MDP model are learned using maximum likelihood estimation from message routing traces. Three different cases using Model Repair in WSNs are described below. In each case, it is assumed that the message (i.e., query) is initiated at the field node $n_{33}$, and the goal is to get the message to the station node $n_{11}$. In each case, the learned MDP model is checked to see if it satisfies the property $R\{attempts\} \leq X[F\ S_{n_{11}}=2]$, where $R\{attempts\}$ is the cumulative reward function value for message forwarding attempts, and X indicates a particular number of message forwarding attempts.

In this use case for a WSN, the model satisfies property. Consider X=100, i.e., ensuring that the MDP model can route a message from field node $n_{33}$ to station node $n_{11}$ under 100 attempts. PRISM indicates that the initial MDP model satisfies this property without any modifications.

In the next use case for a WSN, Model Repair gives a feasible solution. Consider X=40: the original MDP model does not satisfy this property. A parametric model checking of the model is subsequently run with the two parameters p and q, which are correction variables added to the ignore probabilities of field/station nodes and other nodes respectively (which are considered controllable in this formulation), and plug in the resulting non-linear equation into AMPL to get the solution p=−0.045, q=−0.04. So, the property is satisfied by the model if the node ignore probabilities are lowered, since in this case there is a higher chance of a node forwarding a message and hence the number of routing attempts is less.

In another embodiment for a WSN, Model Repair gives a infeasible solution Consider X=19: in this case parametric model checking and non-linear optimization states this to be a "infeasible problem", which indicates that Model Repair cannot perturb the model in order to satisfy the property.

In one embodiment, Data Repair in Wireless Sensor Network is described. First, data traces of message forwarding and traces of query dropping (ignoring) in $n_{11}$ and a node near the message source, viz., $n_{32}$ are considered. Consider that 40% of the traces involving message forwarding have a successful forward, while 60% do not. If probabilities $p_1$ and $p_2$ of dropping those 2 trace types are assigned respectively, the maximum likelihood forwarding probability=0.4/(0.4+ 0.6p), where $p=p_2/p_1$. Using a similar approach, ignore probabilities for $n_{11}$=0.5/(0.5+0.5q), and for node $n_{32}$=0.5/ (0.5+0.5 r).

When a parametric model checking in PRISM is run for the model with these Data Repair transition values, a non-linear equation for the property $R\{attempts\}<19[F\ S_{n_{11}}=2]$ is obtained, which are solved in AMPL to get the values p=0.00001, q=18.8129, r=18.813—with these data corrections, the model learned on the corrected data satisfies the property. That Data Repair can be verified as working by plugging in these values into the model and checking that the property is satisfied by Data Repair.

Figure 5A:
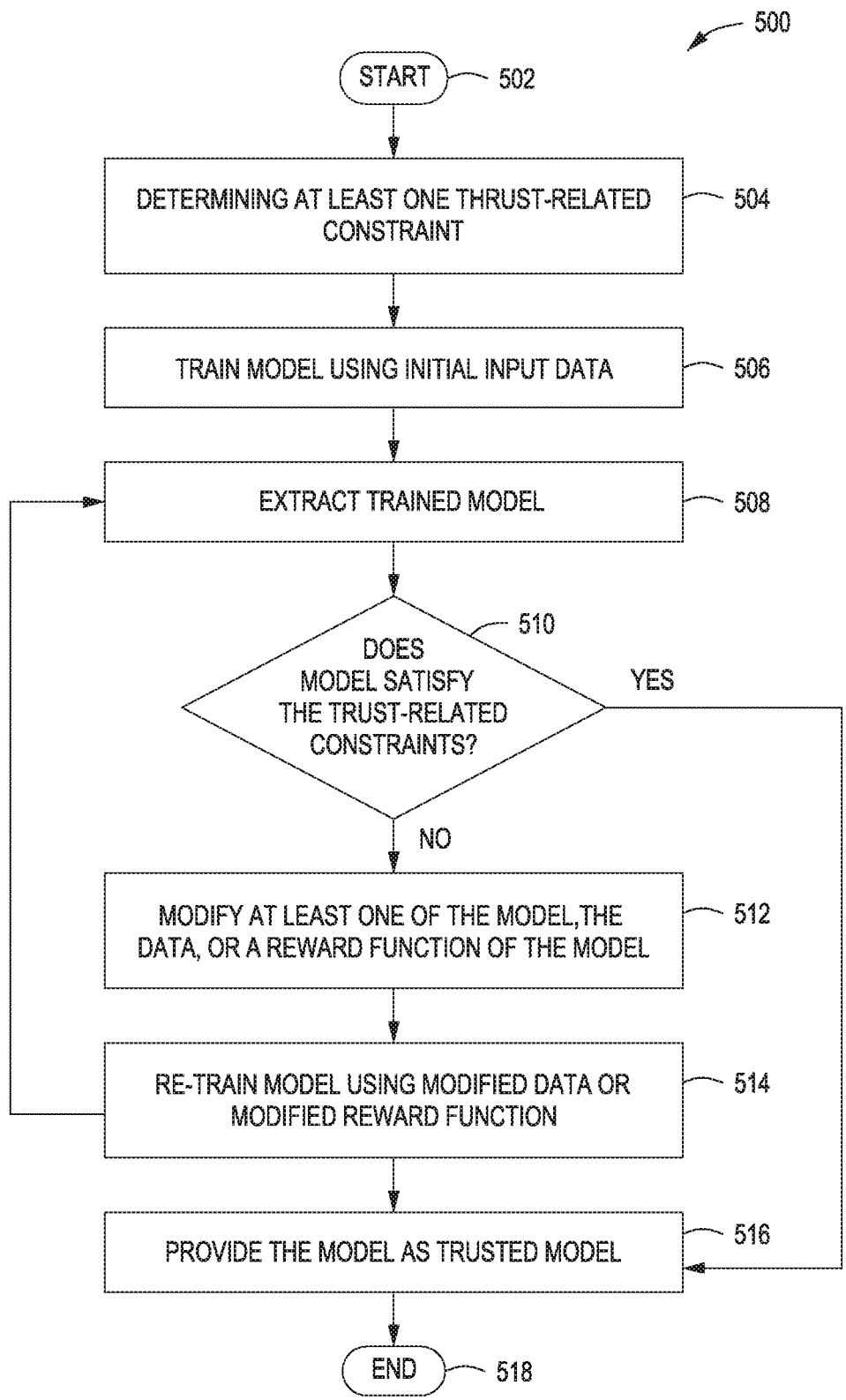
FIG. 5A is a simplified flow diagram of a machine learning method in accordance with some embodiments of the present disclosure.

Referring now to FIG. 5A, a simplified flow diagram of a machine learning method is described in accordance with some embodiments of the present disclosure.

The method 500 begins at 502 and proceeds to 504 where at least one trust-related constraint is determined (e.g., trust-related constraint 114). The trust-related constraints 114 may include a constraint or property that may be provided by a user or operator via a user interface 112. The user interface 112 may include the ability to converting natural language specifications to logical formulas using a tool called ARSENAL, or the like. ARSENAL is adapted to building a natural language (NL) interface for users to interact with the system and specify/refine the trust-related constraints 114 of interest that come from the environment. This would help the analyst to specify rich and complex constraints (e.g., PCTL) in natural language, without being overwhelmed by the burden of using complex logical formalisms. In some embodiments, the trust-related constraints 114 may be set as default values to ensure the model 108 meets a guaranteed level of reliability or correctness. Still, in other embodiments, the trust related constraints can be set as user preferences and stored in association with each user that sets the constraints.

The method proceeds to 506 where the model is trained. The model 108 may first be trained using initial input data 104. The initial model trained and/or the initial input data may include errors or be incomplete certain instances. At 508, the model is extracted. In some embodiments, extracting the model may include providing access to the model or portions of it, extracting or providing access to model parameters 113 of the trained model, and the like.

At 510, the trust-related constraints and the model (e.g., properties/features/parameters of the model) are then checked using a model checking module to see if the model, or output from the model, satisfies those trust-related constraints. If the trained model, or its output, satisfies the trust related constraints at 510, the method proceeds to 516 where the trained model is provided as a trusted model. In some embodiments, the trusted model may be provided to a computer system controller (i.e., such as an autonomous vehicle controller, or robot controller). The controller makes decisions on what actions of the overall system (e.g., a car) should be performed based on the trusted model.

Meanwhile, at 510, if the trained model does not satisfy the trust related constraints at 510, the method proceeds to 512 where at least one of the model, the data, or a reward function of the model is modified. The model is then retrained using the modified data or modified reward function at 514. The method then proceeds back to 508 where retrained model is extracted and then checked again at 510 to see if the parameters of the retrained model satisfy the trust related constraints. The method is iteratively performed until the model satisfies the trust related constraints and a trusted model is produced/provided at 516. Once it is determined that the model satisfies the trust related constraints, the method ends at 518.

Figure 5B:
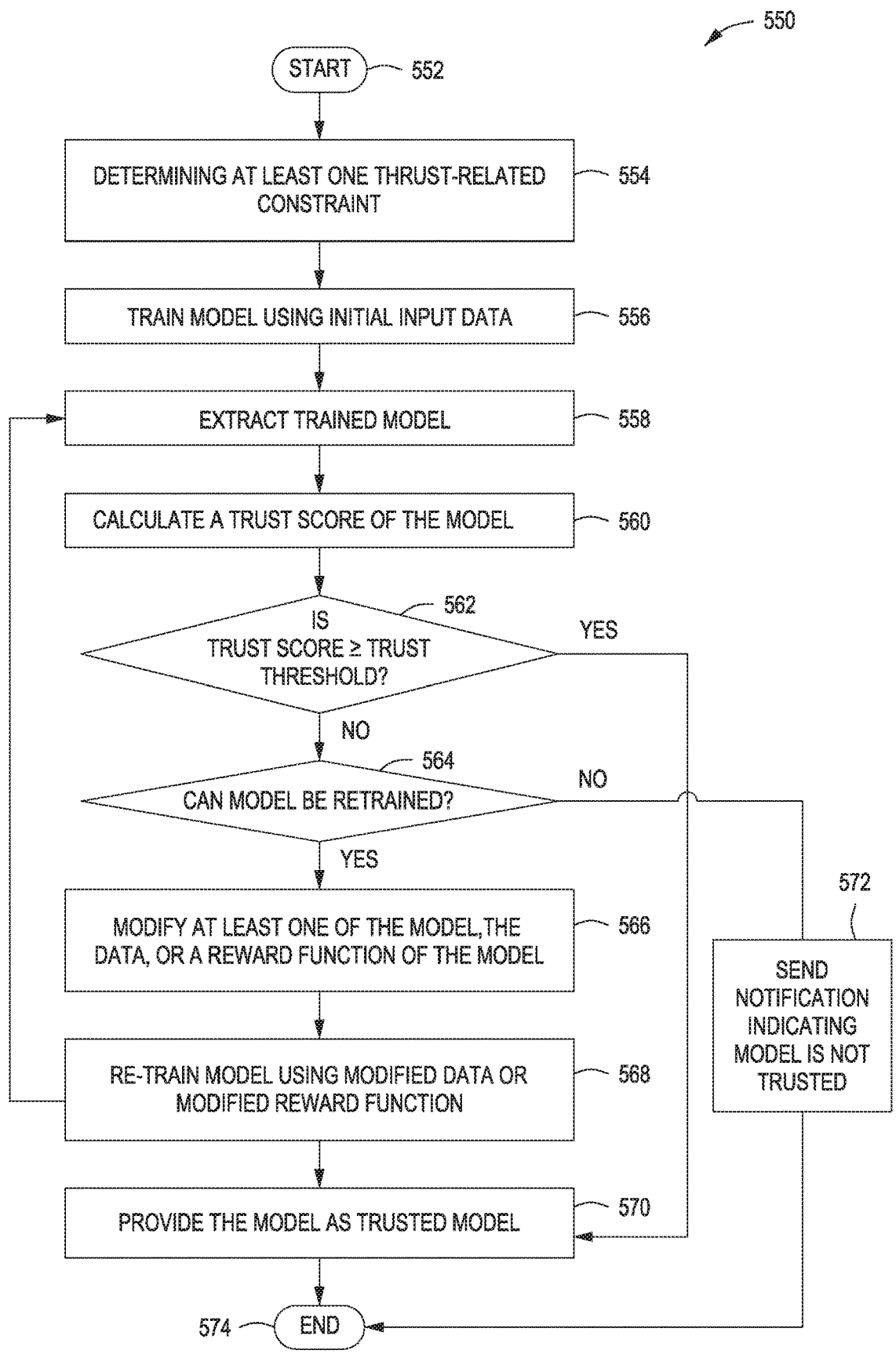
FIG. 5B is a simplified flow diagram of a machine learning method in accordance with further embodiments of the present disclosure.

Referring now to FIG. 5B, a simplified flow diagram of a machine learning method is described in accordance with further embodiments of the present disclosure.

The method 550 begins at 552 and proceeds to 554 where at least one trust-related constraint is determined (e.g., trust-related constraint 114). The trust-related constraints 114 may include a constraint or property that may be provided by a user or operator via a user interface 112. The user interface 112 may include the ability to converting natural language specifications to logical formulas using a tool called ARSENAL, or the like. ARSENAL is adapted to building a natural language (NL) interface for users to interact with the system and specify/refine the trust-related constraints 114 of interest that come from the environment. This would help the analyst to specify rich and complex constraints (e.g., PCTL) in natural language, without being overwhelmed by the burden of using complex logical formalisms. In some embodiments, the trust-related constraints 114 may be set as default values to ensure the model 108 meets a guaranteed level of reliability or correctness. Still, in other embodiments, the trust related constraints can be set as user preferences and stored in association with each user that sets the constraints.

The method proceeds to 556 where the model is trained. The model 108 may first be trained using initial input data 104. The initial model trained and/or the initial input data may include errors or be incomplete certain instances. At 558, the model is extracted. In some embodiments, extracting the model may include providing access to the model or portions of it, extracting or providing access to model parameters 113 of the trained model, and the like.

At 560, a trust score is calculated by the model checking module 116 as discussed above. The trust score is a computation that provides an indication of how well the model 108 satisfies the trust-related constraints 114. In some embodiments, the trust score is based on a probability that the trained model will satisfy the at least one trust-related constraint within a predefined risk tolerance. In other embodiments, the trust score may be a value indicating how many constraints were satisfied with the model. If 100% of the constraints are satisfied, then the score may be 100. If 50% of the constraints are satisfied, the score may be 50.

At 562, if the trust score from the trained model is greater than a predefined trust threshold (described above), the method 550 proceeds to 570 where the trained model is provided as a trusted model. In some embodiments, the trusted model may be provided to a computer system controller (i.e., such as an autonomous vehicle controller, or robot controller). The controller makes decisions on what actions of the overall system (e.g., a car) should be performed based on the trusted model.

Meanwhile, at 562, if the trust score from the trained model is less than a predefined trust threshold, the method 550 proceeds to 564. At 564, it is determined whether the model can be retrained to produce a trusted model. Specifically, as described above, if the model does not satisfy the trust-related constraints 114, or the trust score is significantly below a predefined trust threshold such that there is no amount of modifications to the model, data or reward functions that would produce a trusted model, the system may send a notification to the computer system 148/controller 150 and/or output display 117 indicating that no further modification is possible and that the model is not trusted. In other words, if it is determined that the model cannot be retrained at 564 using one of the repair algorithms described herein in order to produce a trusted model, then the notification indicating that no further modification is possible and that the model is not trusted is sent at 572 and the method ends at 574.

Meanwhile, if it is determined that the model can be retrained to produce a trusted model at 564, the method 550 proceeds to 566 where at least one of the model, the data, or a reward function of the model is modified. The model is then retrained using the modified model, modified data, or modified reward function at 568. The method then proceeds back to 558 the retrained model is extracted, a trust score of the retained model is calculated at 560, and then checked again at 562 to see if the trust score satisfies the trust threshold. The method is iteratively performed until the model satisfies the trust related constraints and a trusted model is produced/provided at 570. Once it is determined that the model satisfies the trust related constraints, the method ends at 574.

Figure 6:
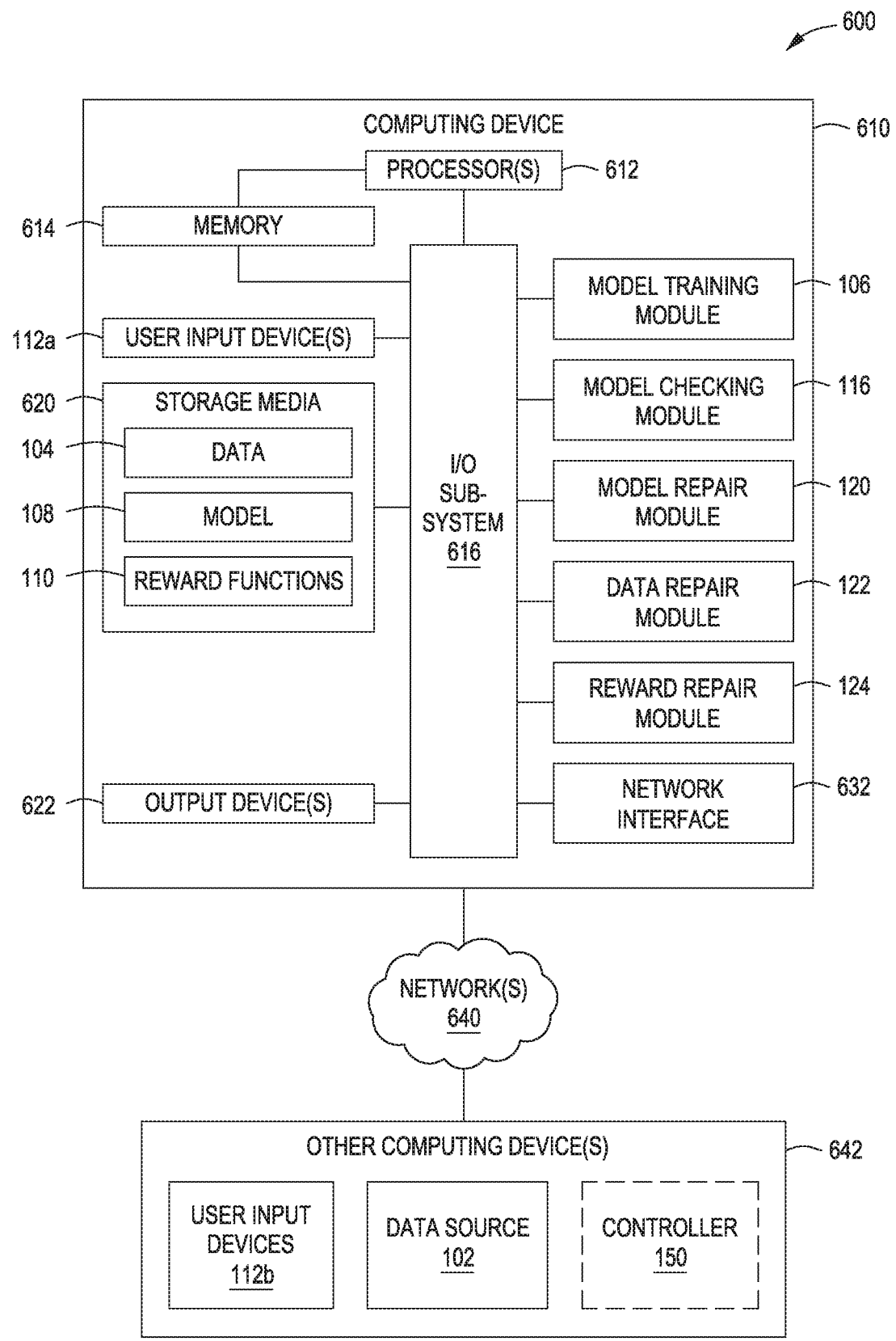
FIG. 6 is a simplified block diagram of a computer system, according to one or more embodiments.

Referring now to FIG. 6, a simplified block diagram of an exemplary computing environment 600 for the machine learning system 100. The illustrative implementation 600 includes a computing device 610, which may be in communication with one or more other computing systems or devices 642 via one or more networks 640. In some embodiments, portions of the machine learning system 100 may be incorporated into other systems or interactive software applications or work with such systems or applications. Such applications or systems may include, for example, operating systems, middleware or framework (e.g., application programming interface or API) software, and/or user-level applications software (e.g., a search engine, a virtual personal assistant, a messaging application, a web browser, another interactive software application or a user interface for a computing device).

The illustrative computing device 610 includes at least one processor 612 (e.g. a microprocessor, microcontroller, digital signal processor, etc.), memory 614, and an input/output (I/O) subsystem 616. The computing device 610 may be embodied as any type of computing device such as a personal computer (e.g., a desktop, laptop, tablet, smart phone, wearable or body-mounted device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of components including one or more user input devices 112a (e.g., a touchscreen, keyboard, virtual keypad, microphone, etc.), one or more storage media 620, one or more output devices 622 (e.g., speakers, LEDs, etc.), one or more model training modules 106, one or more model checking modules, 116, one or more model repair modules 120, one or more data repair modules 122, one or more reward repair modules, and one or more network interfaces 632.

The user interfaces 112a and 112b provided may accept trust-related constraints 114, as described above.

The storage media 620 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), the multi-task multimodal data capture/access module(s) 110 and/or the multi-task multimodal data analyzer 118 reside at least temporarily in the storage media 620. Portions of systems software, framework/middleware, the multi-task multimodal data capture/access module(s) 110 and/or the multi-task multimodal data analyzer 118 may be copied to the memory 614 during operation of the computing device 610, for faster processing or other reasons.

The one or more network interfaces 632 may communicatively couple the computing device 610 to a network, such as a local area network, wide area network, personal cloud, enterprise cloud, public cloud, and/or the Internet, for example. Accordingly, the network interfaces 632 may include one or more wired or wireless network interface cards or adapters, for example, as may be needed pursuant to the specifications and/or design of the particular computing system 600. The network interface(s) 632 may provide short-range wireless or optical communication capabilities using, e.g., Near Field Communication (NFC), wireless fidelity (Wi-Fi), radio frequency identification (RFID), infrared (IR), or other suitable technology.

The other computing system(s) 642 may be embodied as any suitable type of computing system or device such as any of the aforementioned types of devices or other electronic devices or systems. For example, in some embodiments, the other computing systems 642 may include one or more server computers used to store portions of the model 108. In some embodiments, other computing system(s) 642 may be computer system 148 and includes controller 150. The computing system 600 may include other components, sub-components, and devices not illustrated in FIG. 6 for clarity of the description. In general, the components of the computing system 600 are communicatively coupled as shown in FIG. 6 by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method of using machine learning to create a trusted model that improves operation of a computer system controller, the method comprising:
   (a) determining at least one trust-related constraint related to at least one system action that could be performed by the computer system controller;
   (b) training a model of the computer system controller using an initial set of input data;
   (c) extracting the model;
   (d) determining whether the model satisfies the at least one trust-related constraint;
   (e) when it is determined that the model does not satisfy the at least one trust-related constraint:
      (1) modifying at least one of:
         the model using one or more model repair algorithms, wherein the one or more model repair algorithms includes at least one of splitting states, increasing the size of a finite-state control, adding or removing transitions, or changing probabilities of transitions from one state to another state,
the input data using one or more data repair algorithms, or
a reward function of the model using one or more reward repair algorithms; and
(2) re-training the model using at least one of the modified model, the modified input data, or the modified reward function; and
(f) when it is determined that the model satisfies the at least one trust-related constraint, providing the model as a trusted model that improves the operation of the computer system controller by enabling the computer system controller to perform the at least one system action within predetermined guarantees;
wherein the model includes a plurality of states and transitions between states.

2. The machine learning method of claim 1, wherein the at least one trust-related constraint is a temporal logic constraint.

3. The machine learning method of claim 1, wherein the model is initially trained using one of a maximum likelihood inverse reinforcement learning methodology, a supervised learning, or unsupervised learning.

4. The machine learning method of claim 1, wherein the one or more model repair algorithms produces a modified model that minimizes a cost function while satisfying the at least one trust-related constraint.

5. The machine learning method of claim 1, wherein the one or more model repair algorithms consists of at least a parametric model checker and a non-linear optimizer.

6. The machine learning method of claim 1, wherein determining whether the model satisfies the at least one trust-related constraint includes:
determining a trust score of the model indicating of how well the model satisfies the at least one trust-related constraint,
wherein the model is determined to satisfy the at least one trust-related constraint when the trust score is greater than a predefined trust threshold, and
wherein the model is determined to not satisfy the at least one trust-related constraint when the trust score is less than a predefined trust threshold.

7. The machine learning method of claim 6, further comprising:
determining the trust score of the re-trained model;
if the trust score of the re-trained model is less than a predefined trust threshold, than at least one of:
(A) sending a notification to the computer system controller that no further modification is possible and that the model is not trusted; or
(B) repeating steps (c)-(e) until it is determined that the model satisfies the at least one trust-related constraint; and
if the trust score of the re-trained model is greater than a predefined trust threshold, determining that the model satisfies the at least one trust-related constraint.

8. The machine learning method of claim 1, wherein the one or more data repair algorithms includes at least one of adding data, removing data, filtering data, adjusting data, adding data features, or removing data features.

9. The machine learning method of claim 1, wherein the one or more data repair algorithms minimizes a cost function while satisfying the at least one trust-related constraint.

10. The machine learning method of claim 9, wherein modifying the input data using the one or more data repair algorithms includes dropping data points that are determined to be noisy or include errors and keeping reliable data points.

11. The machine learning method of claim 1, wherein the one or more reward repair algorithms includes modifying a reward function by projecting the reward function to a subspace where the at least one trust-related constraint is satisfied.

12. The machine learning method of claim 1, wherein the model is a probabilistic model, and wherein the probabilistic model is one of a discrete-time Markov Chain (DTMC) or Markov Decision Process (MDP).

13. The machine learning method of claim 1, wherein the trust-related constraints are received via a user interface.

14. The machine learning method of claim 13, wherein the user interface is configured to convert natural language specifications to logical formulas.

15. A machine learning system for creating a trusted model that improves operation of a computer system controller, comprising:
a user interface receiving at least one trust-related constraint;
a model training module training a model using input data and machine learning algorithms;
a model checking module determining whether the model satisfies the at least one trust-related constraint; and
a repair module, wherein the repair module includes at least one of:
(a) a model repair module that modifies the model using one or more model repair algorithms consisting of at least a parametric model checker and a non-linear optimizer;
(b) a data repair module that modifies the input data using one or more data repair algorithms; or
(c) a reward repair module that modifies a reward function of the model using one or more reward repair algorithms,
wherein the machine learning system provides the trained model to the computer system controller as a trusted model that improves the operation of the computer system controller by enabling the computer system controller to perform the at least one system action within predetermined guarantees when it is determined that the model satisfies the at least one trust-related constraint.

16. The machine learning system of claim 15, wherein the model is a probabilistic model, and wherein the probabilistic model is one of a discrete-time Markov Chain (DTMC) or Markov Decision Process (MDP).

17. The machine learning system of claim 15, wherein the user interface is configured to convert natural language specifications to logical formulas.

18. A method for using machine learning to create a trusted model that improves operation of an autonomous vehicle controller, the method comprising:
receiving a temporal driving constraint that must be satisfied before the autonomous vehicle controller can perform an action;
training a probabilistic model of the autonomous vehicle controller using an initial set of input data;
determining whether the probabilistic model satisfies the temporal driving constraint;
when it is determined that the probabilistic model satisfies the temporal driving constraint, providing the model for use by the autonomous vehicle controller;

when it is determined that the probabilistic model does not satisfy the temporal driving constraint:
  (1) modifying at least one of:
    the model using one or more model repair algorithms,
    the input data using one or more data repair algorithms, or
    a reward function of the model using one or more reward repair algorithms; and
  (2) re-training the model using at least one of the modified model, the modified input data, or the modified reward function; and
  (3) once it has been determined that the re-trained model satisfies the temporal driving constraint, providing the model to the autonomous vehicle controller as a trusted model that improves the operation of the autonomous vehicle controller by enabling the autonomous vehicle controller to perform the at least one system action within predetermined guarantees.

19. A method of using machine learning to create a trusted model that improves operation of a computer system controller, the method comprising:
  (a) determining at least one trust-related constraint related to at least one system action that could be performed by the computer system controller;
  (b) training a model of the computer system controller using an initial set of input data;
  (c) extracting the model;
  (d) determining whether the model satisfies the at least one trust-related constraint;
  (e) when it is determined that the model does not satisfy the at least one trust-related constraint:
    (1) modifying at least one of:
      the model using one or more model repair algorithms, wherein the one or more model repair algorithms produces a modified model that minimizes a cost function while satisfying the at least one trust-related constraint,
      the input data using one or more data repair algorithms, or
      a reward function of the model using one or more reward repair algorithms; and
    (2) re-training the model using at least one of the modified model, the modified input data, or the modified reward function; and
  (f) when it is determined that the model satisfies the at least one trust-related constraint, providing the model as a trusted model that improves the operation of the computer system controller by enabling the computer system controller to perform the at least one system action within predetermined guarantees.

20. The machine learning method of claim 19, wherein determining whether the model satisfies the at least one trust-related constraint includes:
  determining a trust score of the model indicating of how well the model satisfies the at least one trust-related constraint,
  wherein the model is determined to satisfy the at least one trust-related constraint when the trust score is greater than a predefined trust threshold, and
  wherein the model is determined to not satisfy the at least one trust-related constraint when the trust score is less than a predefined trust threshold.

21. The machine learning method of claim 20, further comprising:
  determining the trust score of the re-trained model;
  if the trust score of the re-trained model is less than a predefined trust threshold, than at least one of:
    (A) sending a notification to the computer system controller that no further modification is possible and that the model is not trusted; or
    (B) repeating steps (c)-(e) until it is determined that the model satisfies the at least one trust-related constraint; and
  if the trust score of the re-trained model is greater than a predefined trust threshold, determining that the model satisfies the at least one trust-related constraint.

* * * * *